United States Patent

McMaster

[15] 3,650,016
[45] Mar. 21, 1972

[54] PROCESS FOR TORQUING THREADED FASTENERS

[72] Inventor: Robert C. McMaster, Columbus, Ohio
[73] Assignee: The Ohio State University, Columbus, Ohio
[22] Filed: Apr. 28, 1969
[21] Appl. No.: 819,885

[52] U.S. Cl................................29/526, 81/52.35, 29/240
[51] Int. Cl..........................................................B23p 19/00
[58] Field of Search....................29/427, 525, 446, 526, 248; 81/52.3, 52.35, 52.4

[56] References Cited

UNITED STATES PATENTS

| | | | |
|---|---|---|---|
| 2,622,465 | 12/1952 | Kanter | 81/52.3 |
| 2,662,435 | 12/1953 | Harmes | 81/52.4 |
| 2,934,985 | 5/1960 | Mutolo et al. | 81/52.4 |
| 2,948,059 | 8/1960 | Bodine | 29/427 |
| 3,016,604 | 1/1962 | Castelnecchi | 29/427 UX |
| 3,224,086 | 12/1965 | Balamuth | 29/525 |
| 3,521,348 | 7/1970 | Pruder et al. | 29/526 X |
| 3,526,030 | 9/1970 | Maropis et al. | 29/526 X |

Primary Examiner—Charlie T. Moon
Attorney—Anthony D. Cennamo

[57] ABSTRACT

The disclosure is a method of applying high-efficiency sonic transducers to torquing threaded fasteners whereby any of a range of desired tension stress levels may be obtained in said threaded fastener. Reference is made to the claims for a legal description of the invention.

8 Claims, 3 Drawing Figures

INVENTOR.
ROBERT C. McMASTER

INVENTOR.
ROBERT C. McMASTER

PROCESS FOR TORQUING THREADED FASTENERS

CROSS REFERENCES

An electromechanical transducer such as a piezoelectric device is capable of transforming high frequency electrical impulses into high frequency mechanical impulses or vice versa. With an alternating-polarity input-voltage imposed on the piezoelectric elements, the transducer generates, transmits and amplifies a series of mechanical compression waves in the piezoelectric material and its metal supporting structure respectively. Considering the transducer alone, a succession of identical compression and tension waves transmitted in a transducer of proper length produces a standing wave pattern.

In a straight bar the standing wave maxima and minima locations correspond respectively to locations of maximum and minimum velocity, minimum and maximum stress, and maximum and minimum displacement of the transducer body. These locations determine optimum positions for points-of-support, "steps" or changes in diameter, tools or mechanical couplers, etc. the node locations on the transducer correspond to locations of minimum axial displacement and velocity, the anti-node locations correspond to locations of maximum axial displacement and velocity or motion. The distance measured on the transducer between adjacent antinodes is equal to one-half wavelength at the fundamental resonance frequency, the length being dependent and variable with the shape.

There is disclosed in U.S. Pat. No. 3,368,085, for "Sonic Transducer" by Robert C. McMaster and Berndt B. Dettloff, and assigned to The Ohio State University, a sonic transducer that combines the driving element (piezoelectric) with the mechanical displacement amplifier (horn) in a novel way. It is, in essence, a resonant horn structure excited internally close to the vibrational node. The excitation is in contrast to the external excitation common when horns are utilized in a sonic transducer system. The transducer therein disclosed is a high Q transducer, exceptionally rugged, compact, and capable of carrying continuous work loads.

There is disclosed in U.S. Pat. No. 3,396,285, for "Sonic Transducer" by Charles C. Libby, and assigned to The Ohio State University, techniques for utilizing the principles of the transducer in the aforementioned patent. The overall structure is improved and operable in a manner to demonstrate commercial feasibility. Some of the features of that transducer include a means of positioning or applying external force through a holding fixture supported near the node of the transducer. The clamping arrangement providing internal static stress or mechanical-bias is acoustically an integral part of the horn. The output end of the transducer is threaded for attachment coupling to the tool.

Disclosed in the copending patent application for "Sonic Transmission LIne," Ser. No. 637,306, filed May 9, 1968, now abandoned, by Charles C. Libby and Karl F. Graff, there is an arrangement for the transmission of sonic energy, sometimes otherwise called vibratory-mechanical energy as it is called hereinafter. The vibratory-mechanical energy transmission line is utilized to transmit vibratory-mechanical energy to a tool or work surface.

Further, it has been disclosed in copending patent application for "Power Conversion Means," Ser. No. 713,034, filed Mar. 14, 1968, now abandoned, by Robert C. McMaster and assigned to The Ohio State University, an apparatus wherein an impact coupling means may be used as an intermediate mechanical member for transmitting the vibratory-mechanical energy from one transducer to another. The intermediate mechanical member for so transmitting the vibratory-mechanical energy is held in position by a diaphragm spaced between two opposing transducers of the system of the invention.

BACKGROUND

Conventional techniques for torquing threaded fasteners involve using a wrench for the application of force to the nut in the case of a nut and bolt assembly whereby upon tightening said assembly, a resultant tension stress is developed in said bolt. Errors in control of bolt stress can occur when torque wrench methods of tightening are employed in cases where the mating surfaces of the nut and plate surfaces are lubricated or the mating surface are otherwise "contaminated."

A survey of he prior art discloses that instruments have been devised to facilitate the torquing of threaded fasteners wherein vibratory energy is applied to the nut of a nut-bolt assembly through the torque wrench. The principle utilized is the phenomenon of reduced friction due to he vibratory energy. The problems of varying conditions of the mating surfaces and controlling the stress level in the bolt are still present using this technique. While the forces which need be applied to the nut using this technique are substantially reduced, the accuracy and ease of handling the equipment are not appreciably enhanced.

SUMMARY OF THE INVENTION

The present invention is a method which eliminates errors in stress level in the bolt due to varying conditions of the mating surfaces, and specifically a method of obtaining predetermined stress levels in threaded fasteners by utilizing vibratory-mechanical energy. More specifically, the invention comprises application of vibratory energy to one end of the bolt via impact coupling causing the volt to vibrate at its natural frequency. While the bolt is vibrating at its natural frequency it increases and decreases in length. The nut is tightened using finger pressure. The nut is easily turned down to the mating surface while the volt is elongated by the effect of the vibratory energy. When the vibratory-mechanical energy is no longer introduced into the bolt, the bolt tends to contract; however, the nut prevents its contraction leaving the bolt in a state of tensile stress or "torqued."

OBJECTS

The present invention has for its principal object a method for establishing a known tension in a bolt-nut and other threaded fastener assemblies.

Another object of the invention is to facilitate the torquing of threaded fastener assemblies by reducing the force required to be applied to said nut to establish a given tension in said nut-bolt assembly.

A further object of the invention is to provide a method which increases the accuracy with which a given tension can be established in threaded fastener assemblies.

Still another object of the invention is to provide a method by which threaded fastener assemblies, which have become rusted or seized, can be easily loosened.

For a complete understanding of the invention, together with other objects and advantages thereof, reference may be made to the accompanying drawings, in which:

DESCRIPTION OF THE PREFERRED EMBODIMENT

Figure 1:
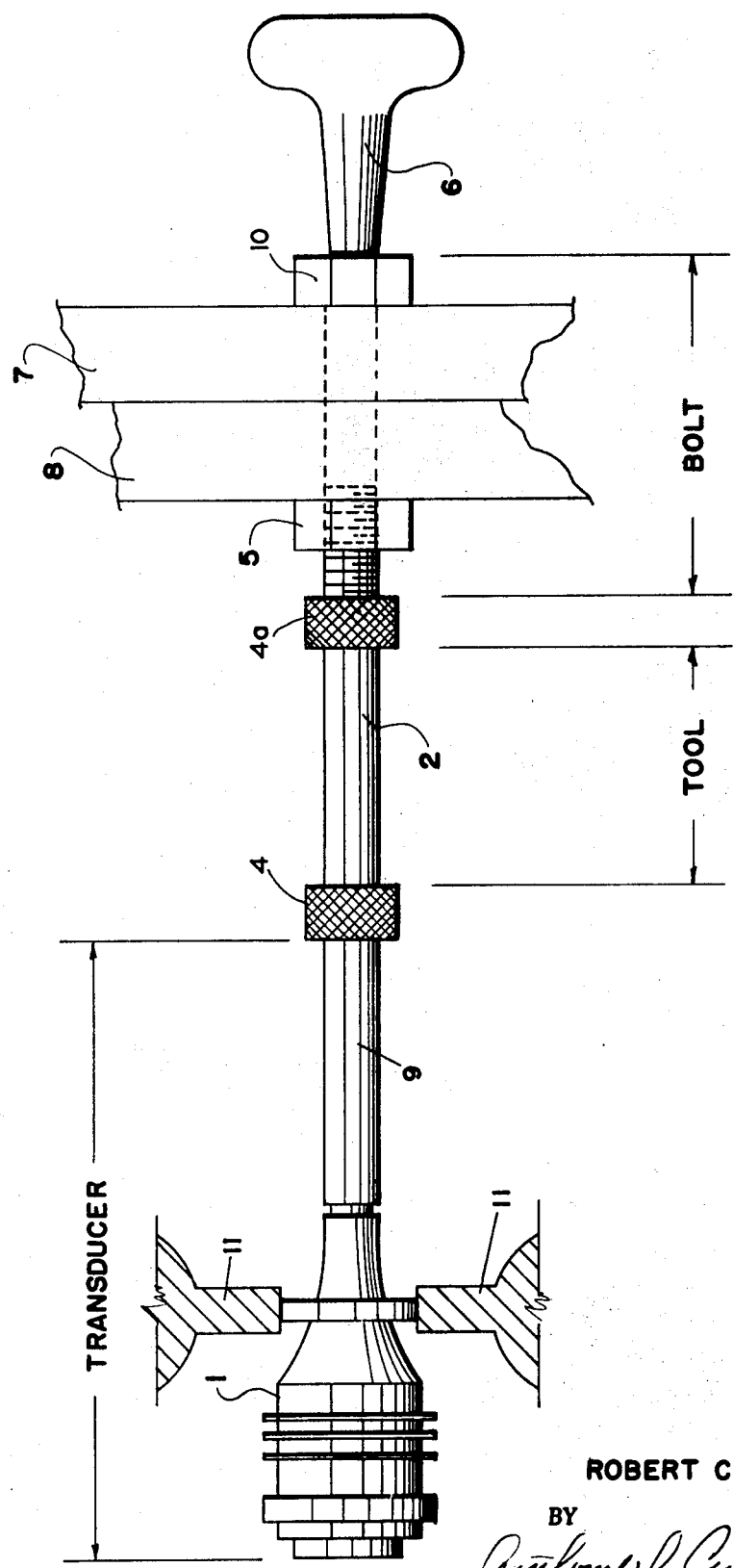
FIG. 1 schematically illustrates an electromechanical transducer, vibratory-mechanical energy transmission line, and energy transmitting tool positioned in conjunction with a backup tool against the head of a bolt.

Vibratory-mechanical energy introduced into a bar causes it to vibrate at its fundamental frequency. As the bar so vibrates it has the characteristic of a half wavelength resonator. The vibration induces alternate states of tensile and compressive stress throughout the length of the bar. The bar contracts during the half cycle when it is under compressive stress; the bar expands during the half cycle when it is under tensile stress. It is this phenomenon which is utilized in the present apparatus and method for torquing threaded fasteners.

The apparatus and method of the present invention facilitates the introduction of vibratory-mechanical energy into a male threaded fastener thereby causing the threaded fastener to vibrate at its fundamental frequency. When the threaded fastener vibrates at its fundamental frequency it expands during the half cycle the bar is in tension, and contracts during the half cycle it is in compression. During the half cycle the threaded fastener is in tension the female portion of the threaded fastener may be easily turned. This is due to the fact that friction at the critical interfaces is alleviated. The critical interfaces are those interface (1) between the head 10 of the male threaded fastener and the material 7, (2) between the female portion 5 of the threaded fastener and the material 8, and (3) between the mating threads of the male and female portions of the threaded fastener. The friction at these critical interfaces is reduced or eliminated when the tension (expansion in length) in the bolt is sufficient to increase the distance between the inner faces of the female portion 5 of the threaded fastener and the head 10 of the threaded fastener to a distance exceeding the total thickness of the material 7, 8 being secured or fastened together.

When the female portion of the fastener is turned, it turns freely until the length of the male portion of the fastener 10 at maximum tension extension is just equal to the total thickness of the materials being bolted together. Upon the termination of sonic excitation, the threaded fastener 10 contracts. However, where the female portion 5 of the threaded fastener has been turned so that it is adjacent to the surface of the materials 7, 8 being secured or fastened together, the male portion 10 of the threaded fastener is restrained from contracting; this creates tensile stress in the threaded fastener 10. This tensile stress is equal to the maximum tensile stress within the threaded fastener (which was introduced by sonic excitation) when the head of the male threaded fastener 10 and the female portion 5 of the threaded fastener were adjacent to the material 7, 8 being secured or fastened.

Referring now generally to FIG. 1 there is shown apparatus for torquing a threaded fastener (a hexhead bolt 10 and nut 5 are the fasteners illustrated). The apparatus comprises: an electromechanical transducer 1 and a vibratory-mechanical energy transmission line 9 which is secured to the tip of the energy concentrating horn of the electromechanical transducer 1; the combination of the electromechanical transducer 1 and vibratory-mechanical energy transmission line 9, labeled "transducer" in the figure, is supported by structures 11 secured to the node of the electromechanical transducer 1; an impact coupling device 4 is secured to the vibratory-mechanical energy transmission line 9 at the end opposite that end which is secured to the electromechanical transducer 1; the tool 2 is engaged at opposite ends with the impact coupling devices 4, 4a; the second impact coupling device 4a is adjacent to the threaded portion of the threaded fastener 10 which is labeled "bolt" in the figure; a bucking bar 6 placed against the head of the bolt 10 facilitates positioning the bolt 10; the nut 5 or female portion of the bolt 10 is positioned on the threads of the bolt 10. The aforedescribed apparatus is used to create a predetermined tensile stress in the bolt 10 which fastens materials 7, 8 together.

The preferred embodiment of the present invention is further utilized to introduce vibratory-mechanical energy into a threaded fastener to carry out the method of torquing described hereinbelow. As the electromechanical transducer 1 is excited by an alternating-polarity input current at its electrical frequency the electrical energy is transformed into vibratory-mechanical energy manifested by motion of the tip of the horn of the transducer 1. The vibratory-mechanical energy is transmitted through the vibratory-mechanical energy transmission line 9 to the impact coupling 4. The impact coupling 4 transfers the vibratory-mechanical energy to the tool 2 which in turn impacts the second impact coupling 4a. The second impact coupling 4a transfers the vibratory-mechanical energy to the bolt 10. The vibratory-mechanical energy so introduced into the bolt 10 causes the bolt 10 to vibrate at its fundamental frequency. The bucking bar 6, positioned adjacent to the bolt 10 head, maintains the bolt 10 head securely positioned adjacent to the plate 8.

As the bolt 10 vibrates at its fundamental frequency as a half wavelength resonator, alternate states of compression and tension are created in the bolt 10. The bolt 10 expands during the half cycle it is in tension and contracts during the half cycle it is in compression. The vibratory-mechanical energy reduces the frictional forces existing at the mating threads of the nut 5 and bolt 10 and other contacting surfaces; the nut may be easily turned. The nut is turned and is drawn into contact with the plate 8; friction at the interfaces between the nut 5 and the plate 8 surface, and between the bolt 10 head and plate 7 surface, is reduced or eliminated. This reduction in friction is attributable to the vibratory-mechanical energy introduced into the bolt and, more importantly, to the tension expansion of the bolt 10. The tension expansion of the bolt 10 is sufficient to cause the spacing between the inner faces of the nut 5 and bolt 10 head to exceed the total thickness of the members 7, 8 being bolted together. The maximum tensile stress (and, hence, the maximum expansion) in the bolt 5 is controlled by varying the stress magnitude created by the vibratory-mechanical excitation. This is done by varying the power level of the vibratory-mechanical energy input. When the nut 5 is turned down, it turns freely until the distance between the inner faces of the nut 5 and bolt 10 head (when the bolt is in tension) is equal to the thickness of the materials 7, 8 being bolted together. After vibratory-mechanical excitation of the bolt is terminated, the bolt ceases to cyclically expand and contract. The bolt 10 then tends only to contract; however, the bolt 10 is restrained from contracting by the nut 5 which has previously been turned to the position adjacent to the plate 7 surface. The nut, by so restraining the bolt 5 from contracting, maintains the tensile stress in the bolt 10 created by the vibratory mechanical energy. This tensile stress is controlled by and equal to the maximum tensile stress created in the bolt during the period the bolt was excited with the vibratory-mechanical energy while the nut 5 and bolt 10 head were contacting the materials 7, 8 being bolted together.

Figure 2:
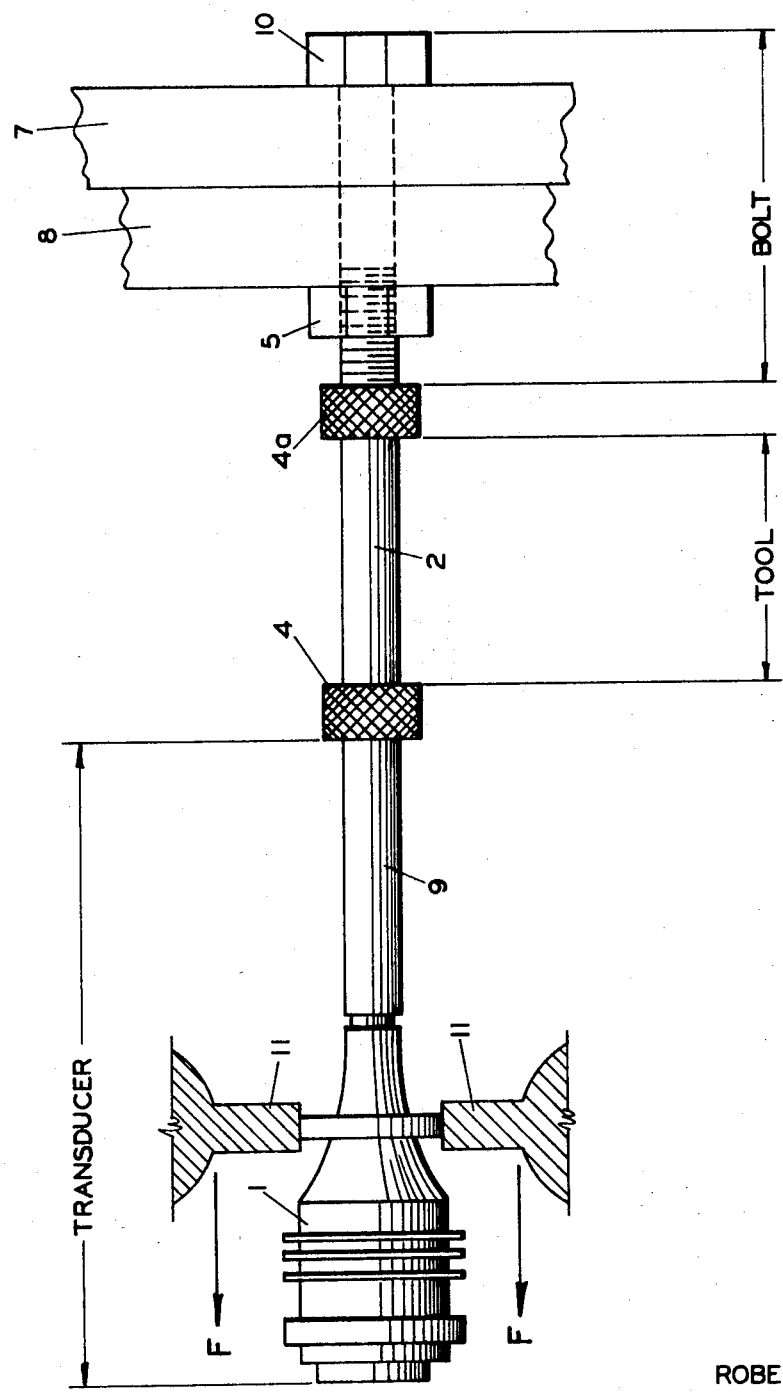
FIG. 2 schematically illustrates an electromechanical transducer, vibratory-mechanical energy transmission line and energy transmitting tool positioned against the head of a bolt wherein a small tensile stress is exerted on the bolt by a force exerted on the transducer; and, FIG. 3 schematically illustrates an electromechanical transducer, vibratory-mechanical energy transmission line and energy transmitting tool positioned against the head of a bolt wherein a compressive force is exerted on the head of the bolt by force exerted on the transducer.

Referring now to FIG. 2 there is shown an alternate embodiment of the invention. The alternative embodiment illustrated in FIG. 2 is identical to that illustrated in FIG. 1 with the following exceptions:

1. the bucking bar 6 illustrated in FIG. 1 is not used or needed in the embodiment of FIG. 2; and
2. the output impact coupling 4a is secured to the threads of the bolt 10.

The embodiment illustrated in FIG. 2 is used to apply a tensile stress in the bolt 10 in a manner analogous to that method described above in conjunction with FIG. 1. However, in FIG. 2, since no bucking bar is used, a small static force, F, is exerted on the transducer to keep the inner face of the bolt head in contact with the material 7. That is, the transducer is pulled away from the materials 7, 8 so as to bring the inner surface of the bolt 10 head into contact with the material 7 surface.

The bolt 10 of FIG. 2, is then excited with vibratory-mechanical energy creating alternate states of tension and compression (expansion and contraction) in the bolt 10. As in the method described in conjunction with FIG. 1 the nut 5 turns freely until the distance between the inner faces of the nut and bolt 10 head (when the bolt 10 is in tension) is equal to the thickness of the materials 7, 8 being bolted together.

Upon termination of the vibratory-mechanical excitation the bolt ceases to cyclically expand and contract and the bolt 10 tends only to contract. The nut 5 restrains the bolt 10 from contracting and thereby maintains the tensile stress in the bolt 10 created by the vibratory-mechanical energy. As in the first-described embodiment the tensile stress is controlled by and equal to the maximum tensile stress created in the bolt during the period when the bolt was excited with vibratory-mechanical energy while the nut 5 and bolt 10 head were contacting the materials 7, 8 being bolted together.

Figure 3:
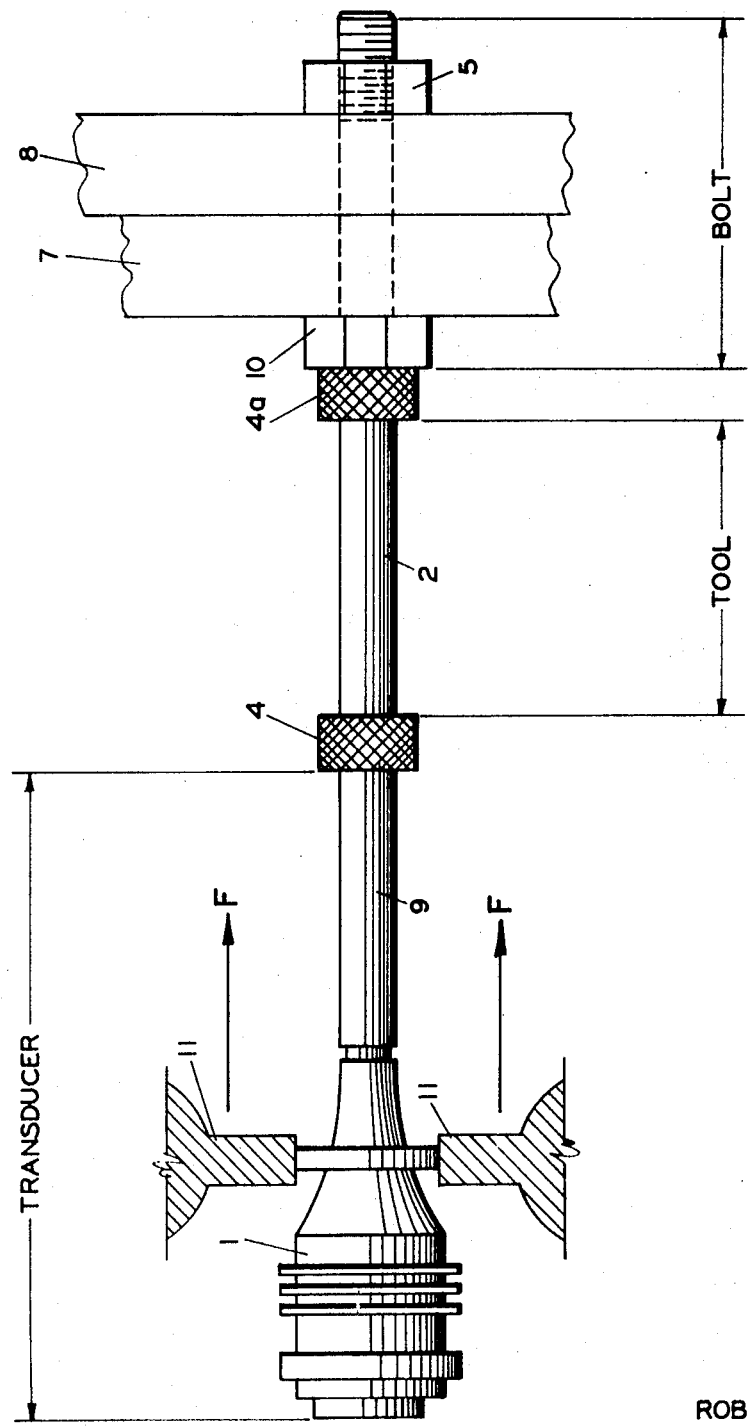

FIG. 3 illustrates yet another embodiment of the present invention. FIG. 3 is directly analogous to the aforedescribed embodiment. FIG. 3 contemplates the elimination of the bucking bar 6 illustrated in FIG. 1 and the necessity for securing the output impact coupling 4a to the threaded portion of the bolt 10 (as illustrated in FIG. 2). The output impact coupling 4a as illustrated in FIG. 3 is positioned against the head of the bolt 10. A small static force, F, exerted on the transducer is transmitted through the transmission line 9, tool 2, and impact couplings 4, 4a to the bolt 10 head. This keeps the inner face of the bolt 10 head in contact with the plate 7. When the bolt 10 is excited with vibratory-mechanical energy, as in the two methods described above, the bolt 10 alternately expands and contracts as it goes through the respective alternate half cycles of tension and compression. The nut 5 is turned until it is finger-tight against the material 8 while the bolt 10 is excited with vibratory-mechanical energy. As in the aforedescribed methods, when the vibratory-mechanical energy is terminated, the bolt 10 tends to contract but is restrained from so doing by the nut 5. This maintains the tensile stress in the bolt 10 created by the vibratory-mechanical energy.

Creating a known stress level in a bolt 10 or fastener is the process commonly referred to as "torquing." Conventional methods rely on turning the nut 5 and "stretching" the bolt 10 to create a desired stress level. This often involves guess work because the frictional forces between the nut 5 and the bolt 10 threads and plate 7, 8 are unknown or varying parameters which depend on the condition of the contacting surfaces. By contrast, the methods of the present invention for bolt tensioning or torquing involve establishing longitudinal vibrations in the material of the bolt 10 itself. The present invention provides a system and method for alleviating friction and providing a precise and predeterminable means for establishing any desired level of tensile stress in the fastened bolt 10. The stress levels attainable in a given bolt 10 using the systems and methods of the present invention are a function of the characteristics of the material of which the bolt is made. Variation of the power input of the vibratory-mechanical energy into the bolt 10 will create different levels of dynamic stress in the bolt 10 in accordance with the power input. The power input, therefore, controls the amount of tension created in the bolt 10.

There are times when it is desirable to combine the vibratory-mechanical method of creating tensile stress in threaded fasteners with the conventional method of torquing (using a torque wrench). Where the conventional method of torquing is so combined with the vibratory-mechanical method of the present invention, the tensile stresses introduced by the respective methods are additive. That is, the tensile stress retained in the male portion of the threaded fastener equals the tensile stress attributable to the vibratory-mechanical excitation plus the stress attributable to the conventional torquing of the threaded fastener by "streching" the male portion thereof. In practice, the threaded fastener is stressed by the method described hereinabove and then torqued (while the threaded fastener is still being excited by vibratory-mechanial energy) to a preselected value using a conventional torque wrench. The stress in the male portion of the threaded fastener equals the sum of the stresses attributable to the vibratory-mechanical excitation and the conventional torquing.

It should be observed that the present invention is not limited to use with nuts and bolts. This invention may be applied to any types of threaded mechanical fasteners, including pipe, bars, tubes, collars, studs, resurfacing bars in concrete, fasteners that are applied by compression of a member into a stud or shaft, etc. In short, the present invention may be used to create desired stress levels in all forms of threaded or unthreaded mechanical fastening systems which involve use of stress within a member to apply clamping forces to an assembly.

Accordingly, although certain and specific embodiments have been illustrated, it is to be understood that the systems and methods of the present invention may be modified without departing from the true spirit and scope thereof.

I claim:

1. A method for establishing tensile stress in a threaded fastener comprising tHe steps of maintaining the head of said threaded fastener in contact with the materials being secured together while attaining alternating expansion and contraction in said threaded fastener as a halfwave longitudinal resonator including intermittently applying a source of vibratory-mechanical energy to one end of the male portion of a threaded fastener causing said fastener to vibrate at its resonant frequency thereby establishing alternating stress in said fastener parallel to its length, turning the female portion of said threaded fastener against the surface of the material adjacent said female portion of said threaded fastener, the free movement of said fastener during the tension half-cycles of stress permitting said turning, and removing said source of vibratory-mechanical energy from said end of said threaded fastener thereby leaving said threaded fastener in a state of tension.

2. A method as described in claim 1 wherein said step of maintaining the head of said threaded fastener in contact with the materials being secured together further comprises applying a low static compressive force against the head of said threaded fastener thereby maintaining said head in contact with said materials being secured together.

3. A method as described in claim 1 wherein said step of maintaining the head of said threaded fastener in contact with the materials being fastened further comprises securing said source of vibratory-mechanical energy to the threaded end of said threaded fastener and applying a low static tensile force through said source of vibratory-mechanical energy to said threaded fastener thereby maintaining said head in contact with said materials.

4. A method as described in claim 1 wherein said step of applying a source of vibratory-mechanical energy to one end of said threaded fastener further comprises applying vibratory-mechanical energy to the threaded end of said threaded fastener.

5. A method as described in claim 1 wherein said step of applying a source of vibratory-mechanical energy to one end of said threaded fastener further comprises applying said vibratory-mechanical energy to the head of said threaded fastener.

6. A method as described in claim 1 wherein said step of turning said female portion of said threaded fastener against the surface of the material adjacent said female portion of said threaded fastener further comprises tightening said female portion finger-tight against said surface of said material.

7. A method as described in claim 1 wherein said step of applying the source of vibratory-mechanical energy to one end of the male portion of said threaded fastener further comprises regulating the power level of said vibratory-mechanical energy so applied thereby controlling the level of tension introduced into said threaded fastener.

8. A method as described in claim 1 wherein said method further comprises the step of tightening said female portion against said adjacent material to a preselected torque using a torque wrench whereby the tensile stress introduced into said male portion of said threaded fastener by said torque wrench is additive to the tensile stress introduced into said male portion of said threaded fastener by the application of said vibratory-mechanical energy.

* * * * *